US006154953A

United States Patent [19]

MacKinnon

[11] Patent Number: 6,154,953

[45] Date of Patent: Dec. 5, 2000

[54] MULTI-TOOL SYSTEM THAT CAN BE USED FOR CONNECTING PIPES

[75] Inventor: Calum MacKinnon, Aberdeen, United Kingdom

[73] Assignee: Coflexip, France

[21] Appl. No.: 09/131,626

[22] Filed: Aug. 10, 1998

[30] Foreign Application Priority Data

Aug. 8, 1997 [FR] France .................................. 97 10221

[51] Int. Cl.7 ............................ B23Q 15/00; F16L 55/00; B08B 3/00

[52] U.S. Cl. ..................... 29/720; 29/402.02; 29/402.06; 29/407.04; 15/104.05; 15/104.09; 134/22.11; 134/22.18; 134/113; 134/166 C

[58] Field of Search ................................. 15/1.7, 104.05, 15/104.09, 104.16, 104.2, 104.31; 405/190, 191, 154, 158; 134/22.18, 22.11, 113, 166 C, 168 C, 167 C; 138/97; 29/720, 717, 402.08, 402.02, 402.06, 402.19, 407.04

[56] References Cited

U.S. PATENT DOCUMENTS

| | | | |
|---|---|---|---|
| 3,508,410 | 4/1970 | Lynch | 405/190 |
| 3,655,122 | 4/1972 | Brown et al. . | |
| 3,905,061 | 9/1975 | Cradeur . | |
| 4,244,296 | 1/1981 | Vertut . | |
| 4,372,003 | 2/1983 | Toelke . | |
| 4,403,363 | 9/1983 | Hess . | |
| 4,473,921 | 10/1984 | Weber et al. . | |
| 4,657,449 | 4/1987 | Marich et al. . | |
| 4,763,376 | 8/1988 | Spurlock, Jr. et al. . | |
| 4,832,530 | 5/1989 | Andersen et al. | 405/191 |
| 5,203,646 | 4/1993 | Landsberger et al. . | |
| 5,428,862 | 7/1995 | Sailer . | |
| 5,857,476 | 1/1999 | Bee et al. | 134/167 C |
| 5,899,795 | 5/1999 | Penza . | |
| 5,903,946 | 5/1999 | Collins et al. . | |
| 5,996,159 | 12/1999 | Irwin . | |
| 6,056,017 | 5/2000 | Kamiyama et al. | 138/97 |
| 6,070,285 | 6/2000 | Geppert | 15/104.05 |

FOREIGN PATENT DOCUMENTS

| | | |
|---|---|---|
| 0773398 | 5/1997 | European Pat. Off. . |
| 2381957 | 2/1978 | France . |
| 2173562 | 10/1986 | United Kingdom . |

OTHER PUBLICATIONS

Article: Diverless Flowline Pull–In to Well Developed, Offshore, Mar. 1996 —1 page.

*Primary Examiner*—David P. Bryant
*Attorney, Agent, or Firm*—Ostrolenk, Faber, Gerb & Soffen, LLP

[57] ABSTRACT

It is of the type comprising a multi-tool system for inspecting, cleaning and replacing members in an oil installation and is one which comprises a support (8) on which there are mounted means (9, 10, 17) capable of laterally shifting at least two devices (22, 29) in opposite directions, it being possible for at least one of said devices (29) to be rotated about one of said directions.

15 Claims, 7 Drawing Sheets

MULTI-TOOL SYSTEM THAT CAN BE USED FOR CONNECTING PIPES

Figure 1:
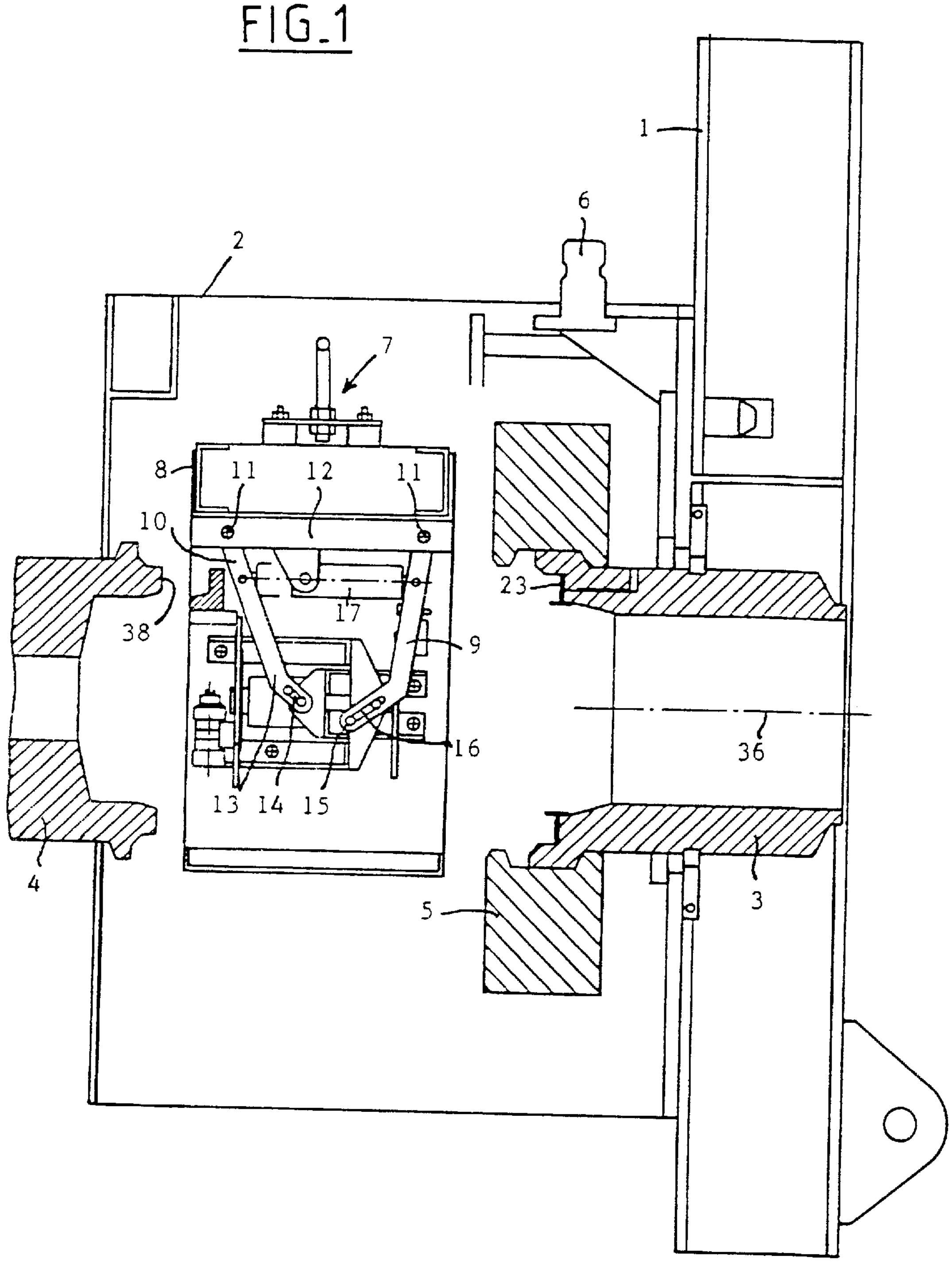

The present invention relates to a multi-tool system that can be used for connecting flexible or rigid pipes and, more particularly, for inspecting, cleaning and replacing components in subsea oil installations.

In the oil industry, and more specifically in offshore oil production far out at sea, the underwater installations are sometimes at very great depths reaching 1000 m and even more. In order to make connections between various assemblies of the underwater installations, without having to resort to divers or similar techniques, increasing use is being made of certain types of vehicle controlled remotely from the surface (ROV for remote operated vehicle) which are capable of transporting and/or moving loads of some weight and of carrying out various and varied operations such as making connections between elements and underwater installations.

The known connection systems are produced in such a way that the connection means are mounted in an end device which is secured to the fixed assembly. When leak tests performed prior to the operational use of the pipeline or periodically during service reveal a defect, it is necessary for the connection means, and in particular the seals, to be repaired or changed. This means that one or more complicated and very expensive interventions are essential because the members requiring the intervention or interventions are located inside the fixed assembly.

In order to overcome these drawbacks the applicant company has proposed, in a French application filed on Jun. 14, 1996 with the No. 96 07 429, that the sealing and locking means be incorporated into a floating cassette which constitutes an interface between the ends of the pipes to be connected, said cassette also playing a part in guiding and in centering the ends to be connected.

However, users sometimes prefer to mount the locking means either on the fixed end before connecting or on both ends after connecting.

One solution which takes this idea of mounting the sealing means directly into account while at the same time correctly connecting the ends of the pipes to be connected is described in another application by the applicant and having the No. 97 06 314.

The subject of the latter application relates, in particular, to a receptacle which is secured to the fixed structure and on which there is mounted a flexible pipe considered as being fixed, the receptacle accommodating, inside it, the two ends of the fixed and moving flexible pipes to be connected. For this, the receptacle comprises a front wall and a rear wall for the passage of the ends of the pipes, the internal dimensions of the receptacle being chosen to be such that the interior space is large enough for the means of locking the connected ends to be shifted in their entirety into their final connected position.

However, there is a requirement regarding the inspection and/or cleaning of the contacting faces of the ends of the pipes before fitting and/or changing the sealing means and/or locking means.

Now, hitherto, when the locking means were to be fitted or changed for any reason, for example following premature or normal wear, said locking means were quite simply brought into their appropriate position without the ends to be connected having been inspected. Likewise, the sealing members used on at least one of the pipes were, after wear or periodically, replaced by new sealing members without the corresponding support regions being examined beforehand. Now, because of the somewhat corrosive fluids that may flow down the flexible pipes, it may be that some parts of one or both flexible pipes, lying in the connection region, might be, if not damaged, then at least soiled. When a cleaning intervention, for example, is to be performed there is not, at the present time, any solution capable of meeting this need. Even the skid generally arranged on the base of the ROV and which, in theory, contains the elements needed for on-site intervention, does not contain special purpose tools except for those for handling some members of the underwater installation, such as for the removal and fitting of the locking means, or alternatively the removal and fitting of sealing members, for example.

The object of the present invention is to propose a multi-tool system or intervention unit which can be controlled by the ROV when it is independent of the latter, that is to say which does not form part of the ROV, or which can be incorporated into the ROV, for example housed in the skid if this is possible.

The subject of the present invention is a multi-tool system for inspecting, cleaning and replacing members in an oil installation, which system comprises a support on which there are mounted means capable of laterally shifting at least two devices in opposite directions, it being possible for at least one of the devices to be rotated about one of the directions.

One advantage of the present invention lies in the fact that it is possible to inspect the elements or members arranged in the receptacle when the fixed installation has one, prior to any intervention. Quite clearly, the same system can be used in underwater installations whether or not they comprise a receptacle.

Another advantage of the present invention is that after inspection the system can, if needed, clean the elements and/or members housed in the receptacle.

Figure 2:
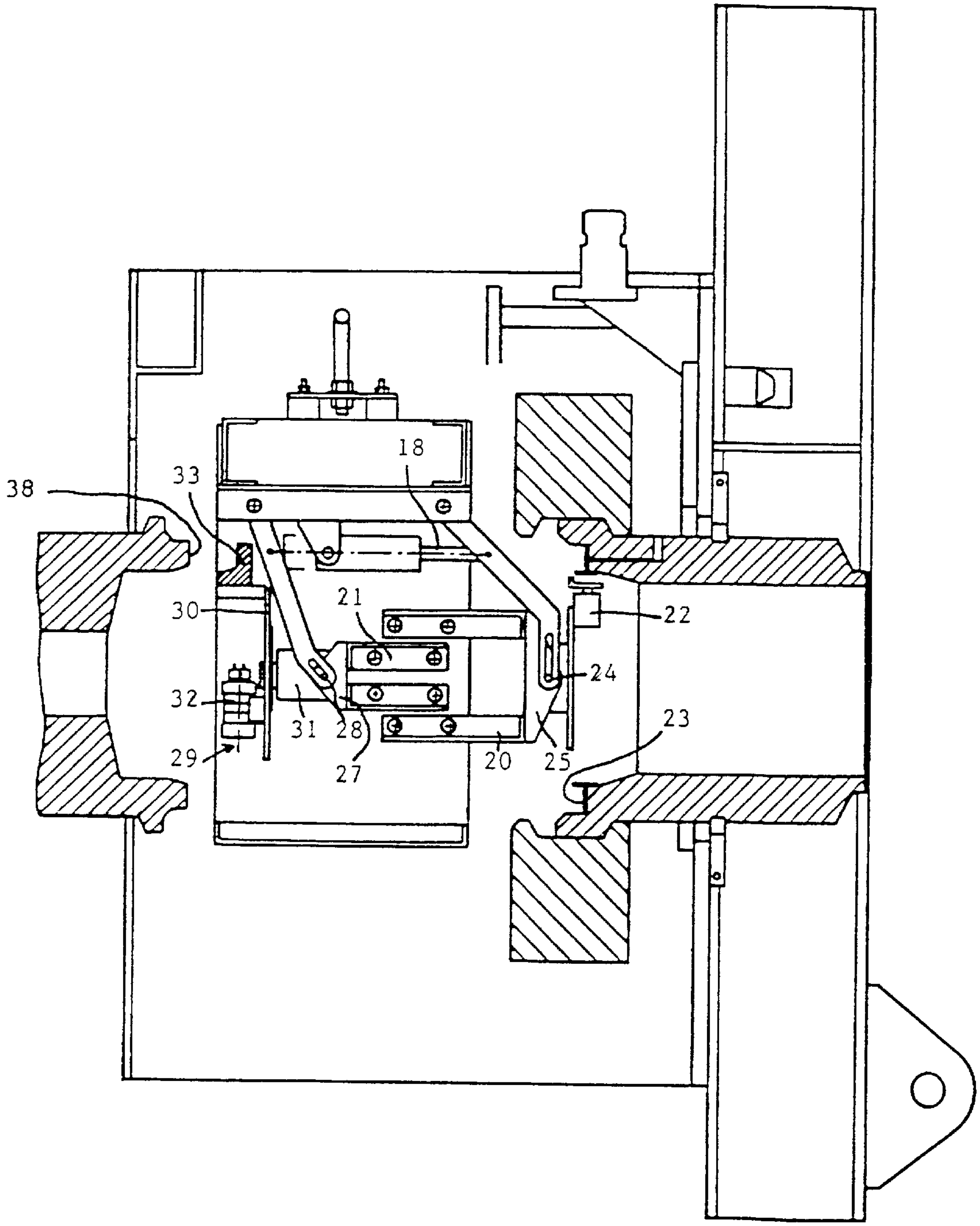
Figure 3:
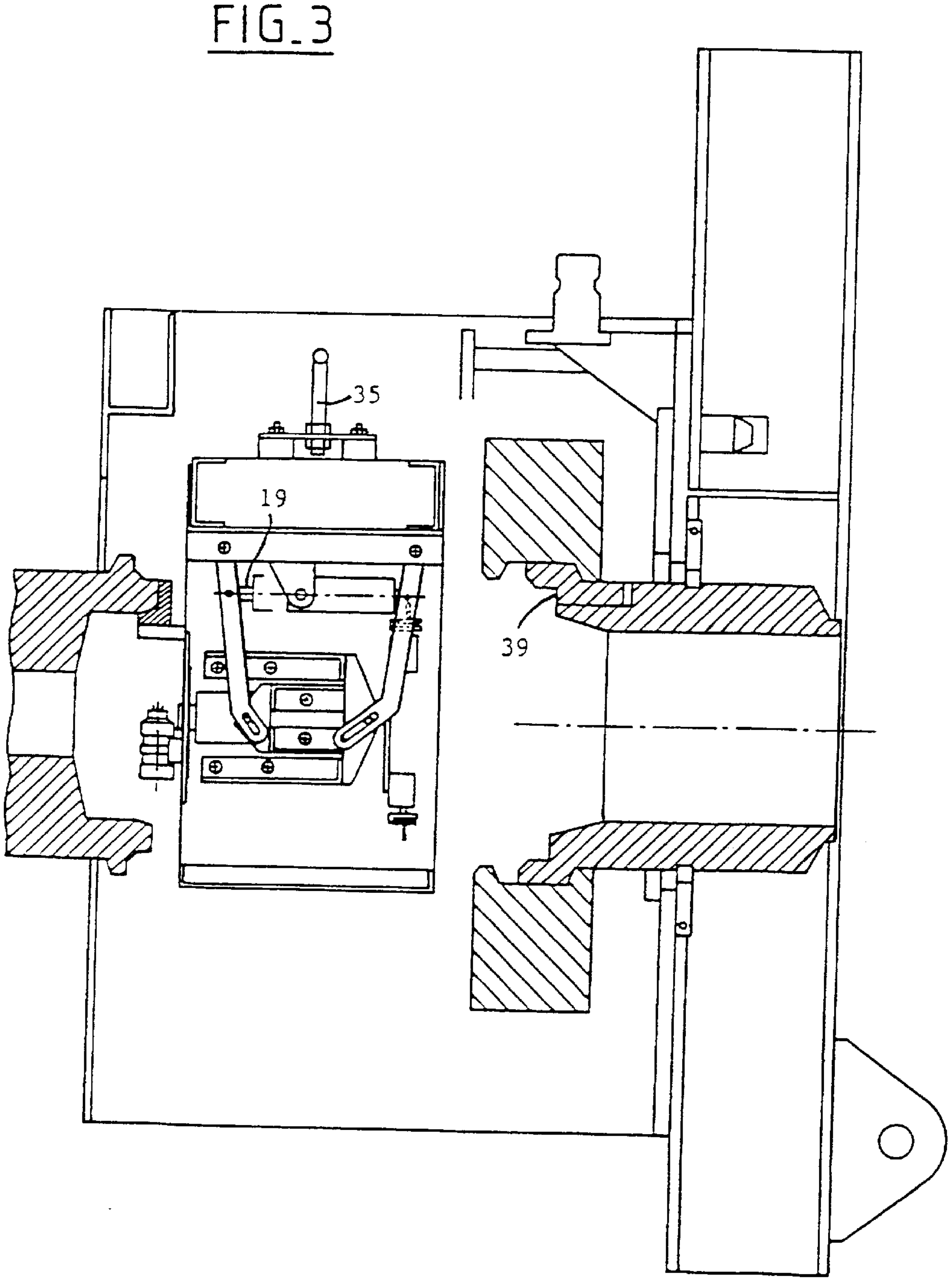
Figure 5:
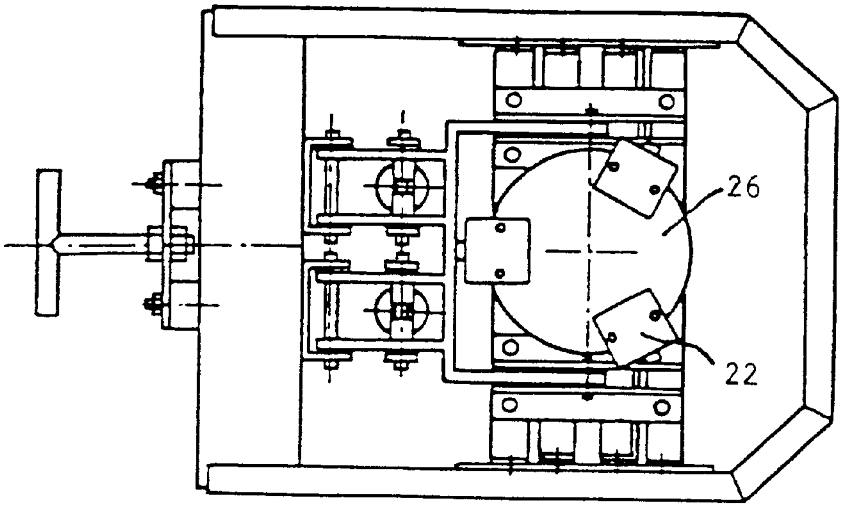
Figure 4:
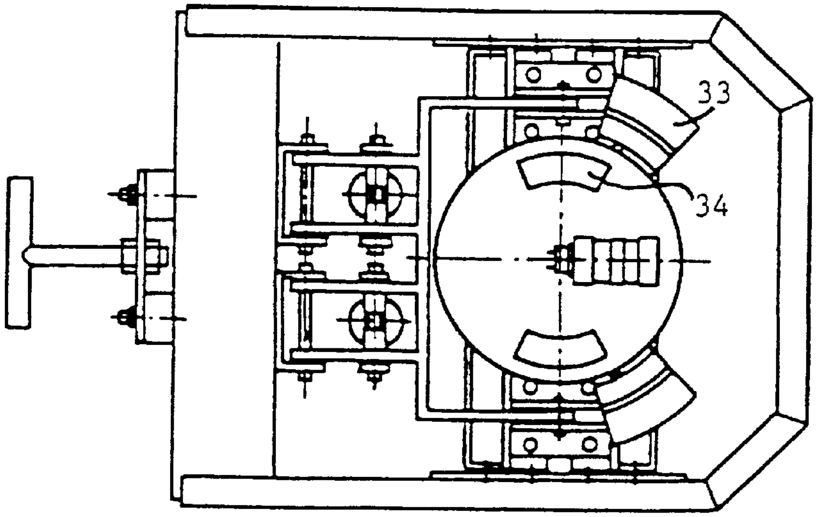
Figure 6:
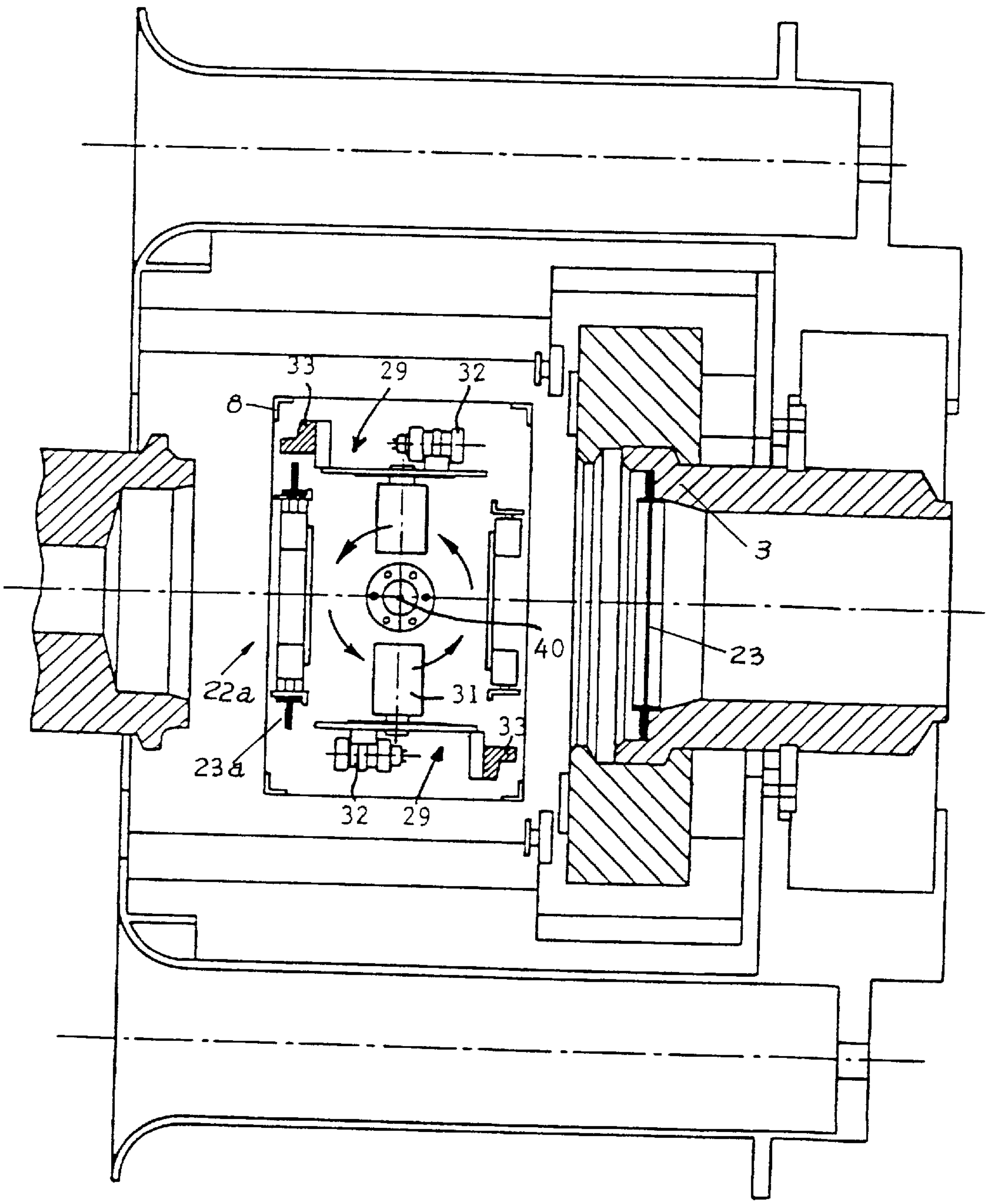
Figure 7:
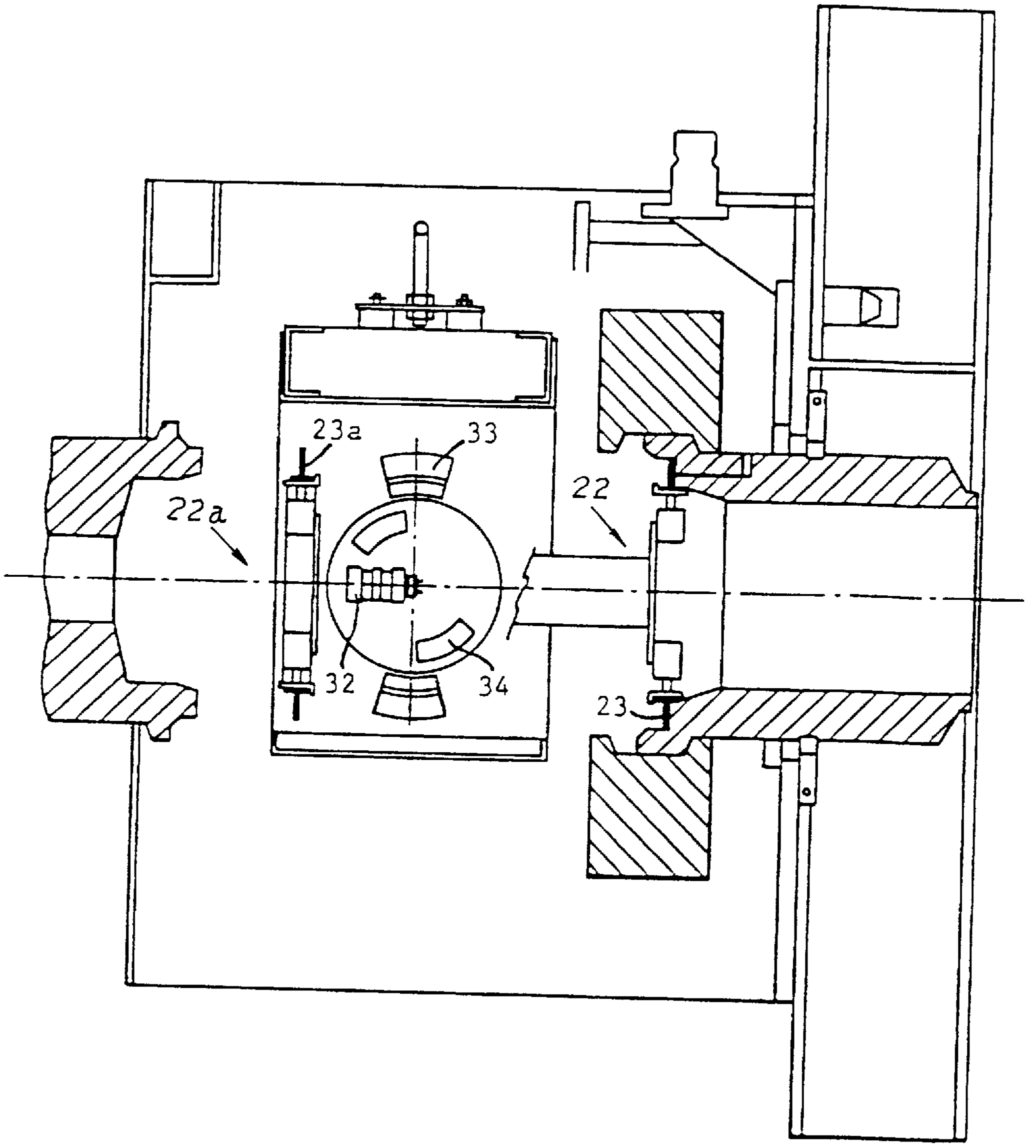
Figure 8:
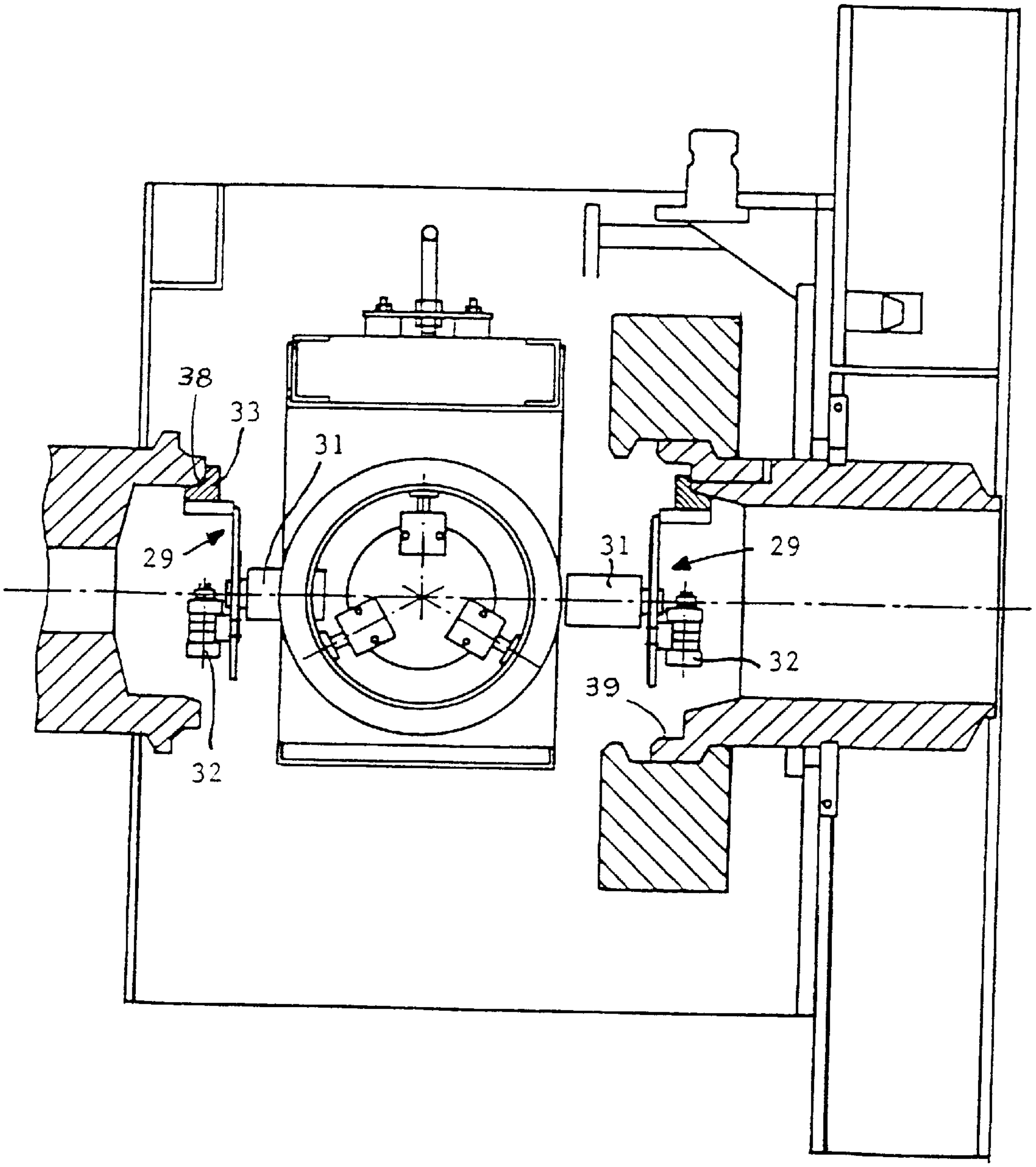

Other advantages and features will emerge more clearly from reading the description of two embodiments according to the invention, and from the appended drawings in which:

FIG. 1 is a diagrammatic view in elevation and part section of a first embodiment of the system according to the invention and arranged in a receptacle with which a fixed structure is equipped, FIG. 2 is the same view as FIG. 1, the system being in a working position, FIG. 3 is the same view as FIG. 1, the system being in another working position, FIGS. 4 and 5 are other lateral views of the multi-tool system of FIGS. 1 to 3, FIG. 6 is a view from above of the system according to a second embodiment of the invention, FIGS. 7 and 8 are side views of the system depicted in FIG. 6.

According to a first embodiment depicted in FIGS. 1 to 5, the multi-tool system is intended to be used in a fixed underwater installation, the installation being depicted partially and comprising a fixed structure 1 on which is mounted a receptacle 2 for accommodating the fixed end 3 of a flexible pipe and the moving end 4 of another flexible pipe, the fixed end 3 and moving end 4 having the same axis 36 and being depicted in their unconnected state, the locking means 5 having been unlocked, by a locking/unlocking member 6, so as to allow the ends 3 and 4 to be separated.

The multi-tool system 7 comprises a support chassis or cassette 8 on which there are mounted two arms 9 and 10 which pivot at one of their ends about pivot pins 11 mounted on a support piece 12 of the cassette 8. The end 13 of the arm 10 is inclined inward and is equipped with an oblong hole 14. The end 15 of the arm 9 is also inclined toward the inside of the cassette and also comprises an oblong hole 16, the end 15 having a length greater than the length of the end 13. The arms 9 and 10 are shifted laterally in opposite directions which are, in the examples depicted, in line with the axis 36 of the ends 3 and 4 of the pipes, by means of a double ram 17 comprising two rods 18 and 19 connected respectively to the arms 9 and 10. It is also possible to use two separate rams each acting on one of the arms 18, 19.

Two support assemblies 20 and 21 are mounted so that they can slide in appropriate slideways which are fixed into the cassette 8 (FIG. 2). The support assembly 20 comprises a device 22 for changing and fitting a seal 23 mounted in the fixed end 3, a stub 24 being inserted in the oblong hole 16 and fixed to one end of an end piece 25. The changing and fitting elements 22 comprise three units spaced uniformly, for example 120° apart, on a plate 26 (FIG. 5). The support assembly 21 comprises an end plate 27 equipped with a stub 28 which is inserted in the oblong hole 14.

A device 29 comprises a platform 30 rotated by a motor 31 and on which there are mounted a camera 32, at least one cleaning brush 33 and at least one nozzle 34 for projecting a jet of cleaning fluid (FIG. 4). The motor 31 rotates the device 29 with respect to the support assembly 21, the axis of rotation of the motor 31 being aligned, for example, with the axis 36.

A handgrip 35 is fixed to the cassette 8 and allows the multi-tool system to be manipulated using an ROV, the cassette 8 being able to rotate about the axis 36.

The way in which this first embodiment of the multi-tool system according to the invention works is as follows:

Once the two ends 3 and 4 have been separated from one another, the multi-tool system is brought by the ROV into the receptacle 2, with the two arms 9 and 10 in their close-together position, as depicted in FIG. 1.

In a first phase (FIG. 2), the ram 17 is actuated in order to deploy the rod 18 which pushes the arm 9, causing it to pivot about its pivot pin 11 until the stub 24 reaches the end of its travel at the end of the oblong hole 16. Then, under the action of the ram 17, the entire support 20 is moved in translation along its guide rails until the device 22 comes into the appropriate position for removing the seal 23, members 37 for gripping and/or fitting a new seal being provided on the device 22 for this purpose. When the seal has been removed, the assembly 20 is returned to its initial position and the assembly 21 is shifted toward the moving end 4 under the action of the ram 17 and the rod 19 which makes the arm 10 pivot until the device 29 is in the inspection and cleaning position. In a first step, the camera 32 inspects the condition of the contact surfaces 38 of the moving end 4. When these surfaces require cleaning, the device 29 is rotated so that the nozzles 32 can spray a jet of cleaning fluid, after which the brushes 33 are actuated to clean the whole of the surfaces 38.

After the surfaces 38 have been cleaned, the surfaces 39 of the fixed end 3 can then be inspected and possibly cleaned once the seal 23 has been removed (FIG. 3). For this, the cassette 8 is extracted from the receptacle by the ROV which turns it through 180° in order to bring the device 29 to face the fixed end 3. After this, the camera inspects the surfaces 39 with a view to possible cleaning.

The cassette 8 is extracted from the receptacle 2 in order to remove the defective seal and collect a new seal. The cassette 8, equipped with a new seal, is introduced once more, in its initial position, into the receptacle 2 in order to fit the new seal on the surfaces 39.

Once cleaning is over and a new seal 23 has been fitted, the multi-tool system is withdrawn from the receptacle 2 by the ROV. After this, the locking means are parted to allow the ends 3 and 4 to be connected, and then actuated again in order to lock the ends 3 and 4 in their final connected position.

FIGS. 6 to 8 depict a second embodiment of the multi-tool system according to the invention.

In the system depicted in FIGS. 6 to 8, the cassette 8 is equipped with a frame on which there are mounted a pair of devices 29 and **29*a* and a pair of devices 22 and 22*a*, the frame being capable of turning, inside the cassette 8, about a vertical axis 40, so as to bring the relevant devices in turn into their working (operative) position, that is to say facing the elements to be inspected, cleaned or changed. Each device 29, 29*a* comprises a camera 32, nozzles 34 for projecting fluid and at least one brush 33 and a motor 31. Likewise, each device 22, 22*a* comprises means for holding a new seal 23*a* and means for removing the seal 23 from the fixed end 3**.

As can be seen in FIGS. 6 and 7, a new seal **23*a* is mounted on a device 22*a*, while the other device 22 is removing the seal 23** that is to be replaced.

In FIG. 8, the devices 29 for inspecting and cleaning the surfaces 38 and 39 of the moving and fixed ends are in action, the brushes 33 cleaning the surfaces.

What is claimed is:

1. A multi-tool system for inspecting, cleaning and replacing members of a connecting assembly in an oil installation, said system comprising:
   - a first device comprising inspecting and cleaning equipment;
   - a second device comprising replacing equipment;
   - a support on which is mounted a shifting arrangement capable of shifting said first and second devices along a longitudinal axis between separated members of said connecting assembly, at least said first device further being rotatable about said longitudinal axis.

2. The system as claimed in claim 1, wherein said oil installation includes first and second flexible pipes which are adapted to be releasably connected to one another, said second device being capable of removing and fitting a seal mounted on one end of said second flexible pipe.

3. The system as claimed in claim 2, wherein said oil arrangement includes first and second flexible pipes which are adapted to be releasably connected to one another but which are arranged facing one another and spaced apart from one another, respective ends of said first and second flexible pipes being located along said longitudinal axis, and wherein said shifting arrangement comprises two arms each of which is moved toward one end of a respective said flexible pipe.

4. The system as claimed in claim 3, wherein said support comprises a housing on which said arms are pivotally mounted.

5. The system as claimed in claim 1, wherein said oil installation includes first and second flexible pipes which are adapted to be releasably connected to one another and wherein said shifting arrangement comprises at least two arms each of which is moved toward one end of a respective one of said flexible pipes, said ends of said flexible pipes being located along said longitudinal axis.

6. The system as claimed in claim 5, wherein said support comprises a housing on which said arms are pivotally mounted.

7. The system as claimed in claim 4, wherein said shifting arrangement further comprises a ram with a double rod, each rod interacting with a respective one of said arms.

8. The system as claimed in claim 1, wherein said oil installation includes first and second flexible pipes which are adapted to be releasably connected to one another and wherein said inspection device comprises at least one camera for inspecting an end of said first flexible pipe and said cleaning device comprises at least one brush for cleaning said end of said first flexible pipe.

9. The system as claimed in claim 8, wherein said at least one cleaning device comprises nozzles for projecting a cleaning fluid toward said first flexible pipe.

10. The system as claimed in claim 1, wherein said oil arrangement includes first and second flexible pipes which are adapted to be releasably connected to one another but which are arranged facing one another and spaced apart from one another, respective ends of said first and second flexible pipes being located along said longitudinal axis, and wherein said shifting arrangement comprises at least two arms each of which is moved toward one end of a respective said flexible pipe.

11. A multi-tool system for inspecting, cleaning and replacing members in an oil installation having at least first and second pipes which are releasably connected together, said system comprising;

a support rotatable about a first axis;

first and second devices for inspecting and cleaning said first pipe;

third and fourth devices for replacing a seal on said second pipe;

a shifting arrangement mounted on said support for laterally shifting said first, second, third and fourth devices in opposite directions along a longitudinal axis extending perpendicular to said first axis and between separated ends of said first and second pipes.

12. The system as claimed in claim 11, wherein said support is rotatable to move:

said first device into an operative position wherein said first device faces either said first or said second pipe;

said second device into an operative position wherein said second device faces either said first or said second pipe;

said third device into an operative position wherein said third device faces said second pipe; and said fourth device into an operative position wherein said fourth device faces said second pipe.

13. The system of claim 12, wherein said first and second devices are located at positions 180 degrees apart from one another and said third and fourth devices are located at positions 180 degrees apart from one another.

14. The system of claim 13, wherein said third and fourth devices are located at positions 90 degrees apart from said first and second devices.

15. The system of claim 12, wherein said shifting arrangement only shifts each respective said device when it is in its respective operative position.

* * * * *